J. R. McCLURE.
DIE THREADING MACHINE.
APPLICATION FILED MAR. 21, 1913.
1,096,257.
Patented May 12, 1914.
4 SHEETS—SHEET 2.
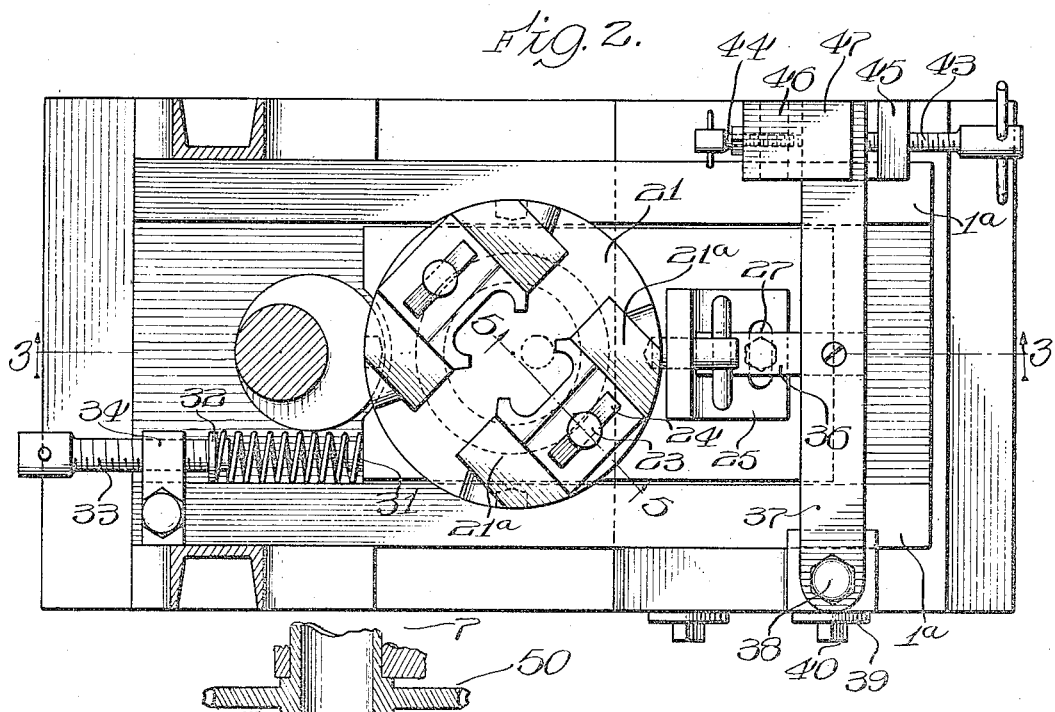
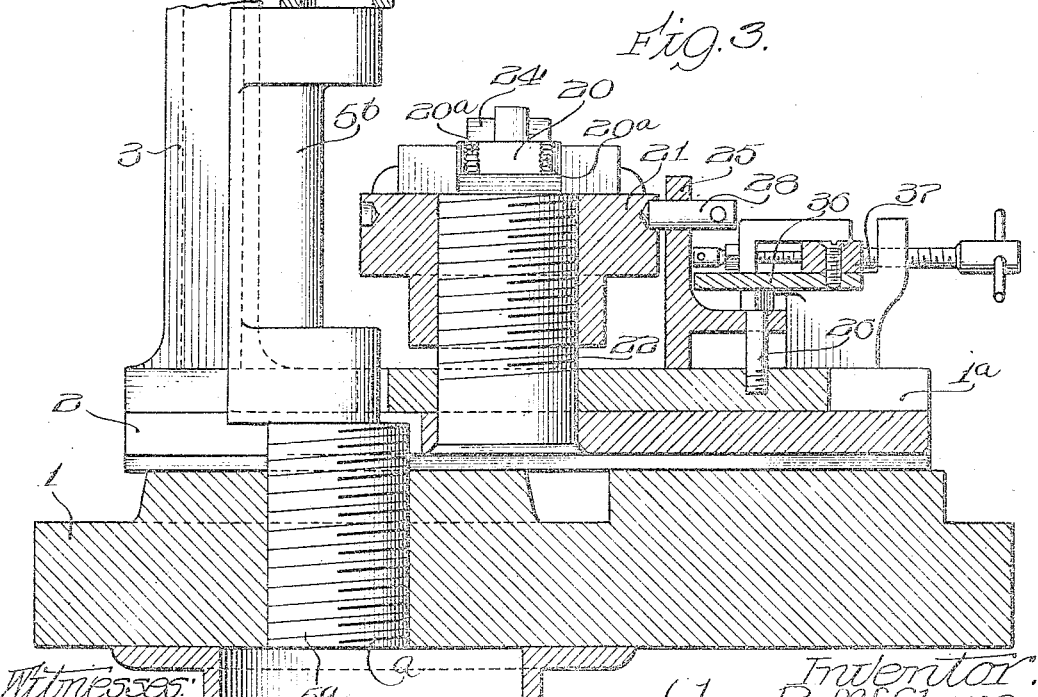

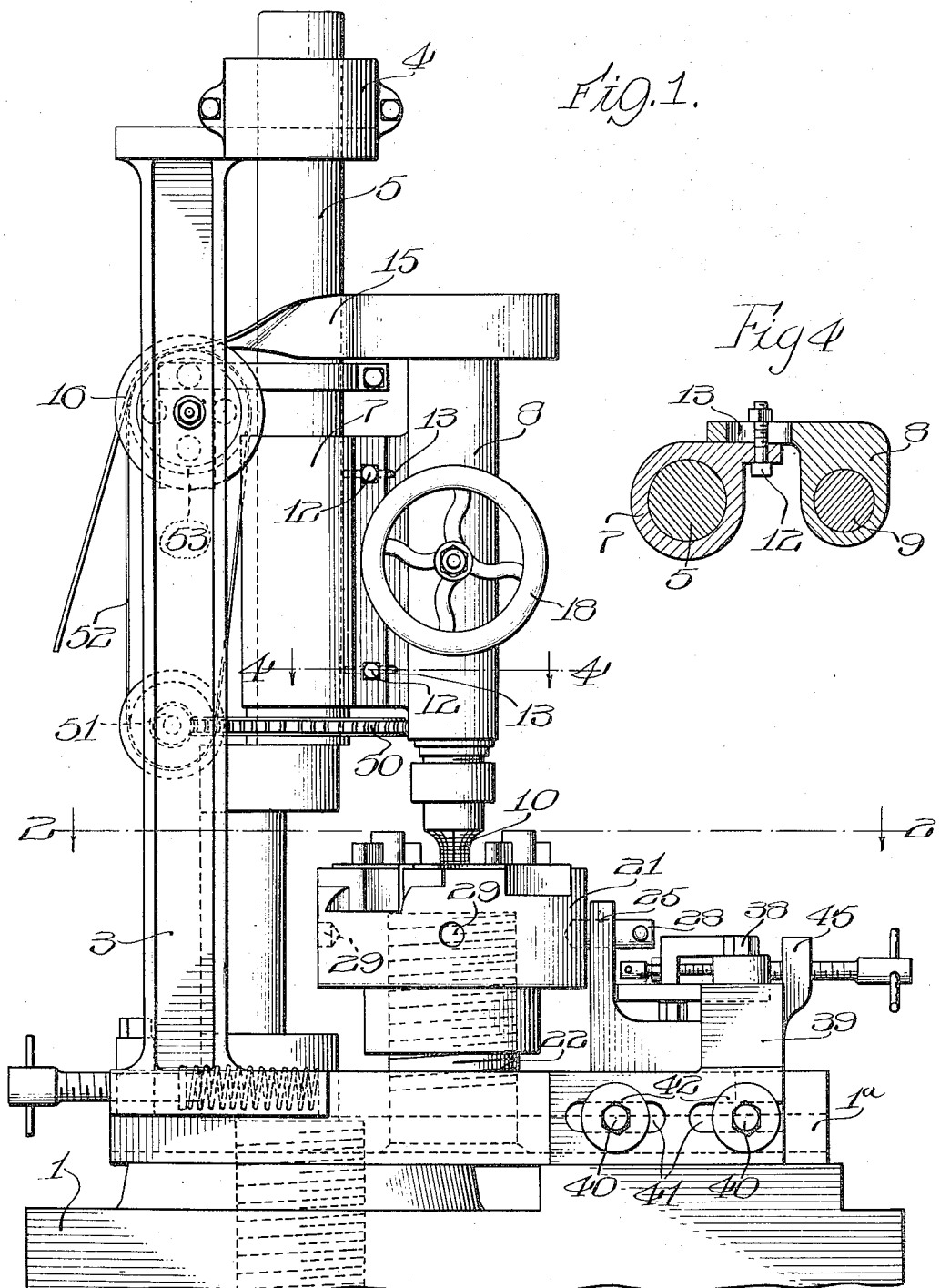

J. R. McCLURE.
DIE THREADING MACHINE.
APPLICATION FILED MAR. 21, 1913.
1,096,257.
Patented May 12, 1914.
4 SHEETS—SHEET 3.
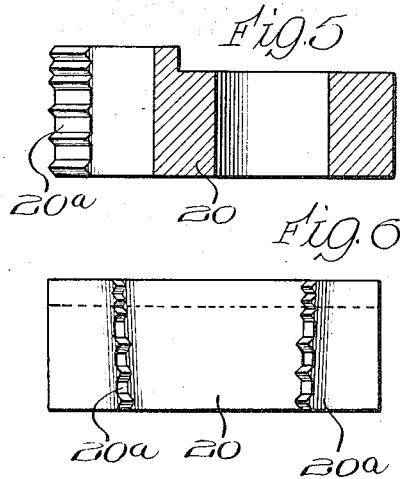
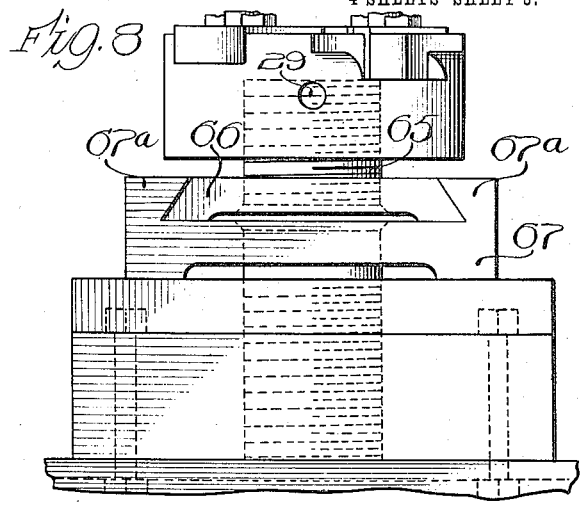
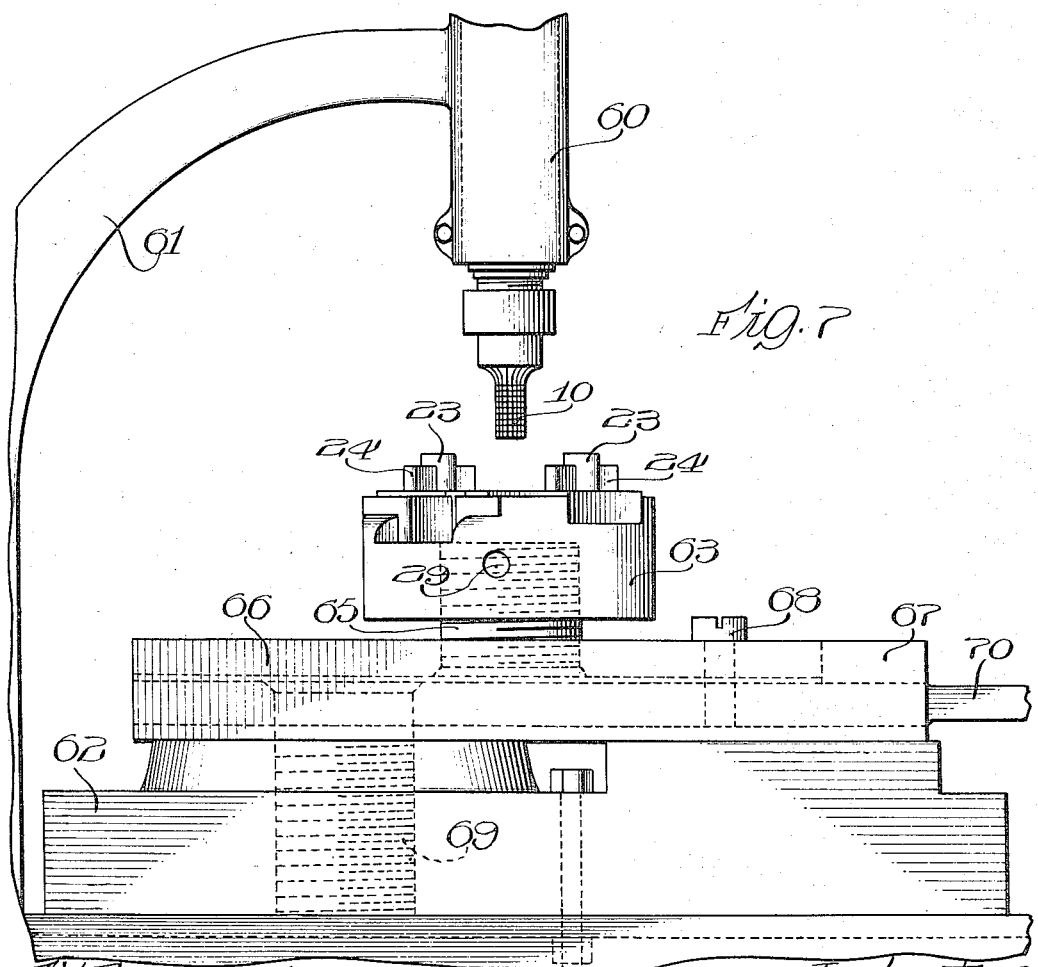
Witnesses:
G. W. Omarus Jr.
H. Bauerle
Inventor:
John R. McClure
By Cheever & Cox, Att'ys

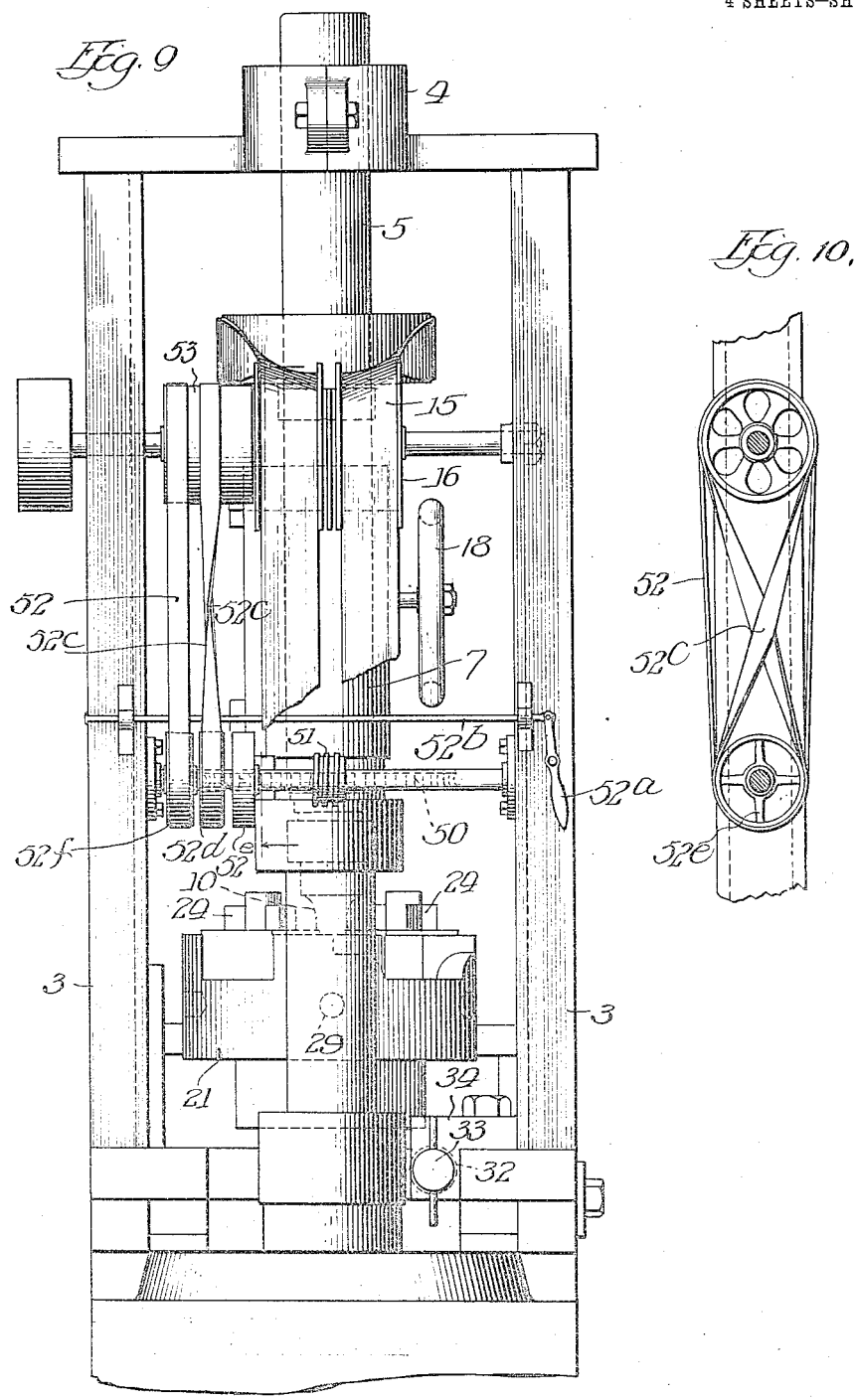

UNITED STATES PATENT OFFICE.

JOHN R. McCLURE, OF CHICAGO, ILLINOIS, ASSIGNOR TO THE NYE TOOL AND MACHINE WORKS, OF CHICAGO, ILLINOIS, A CORPORATION OF ILLINOIS.

DIE-THREADING MACHINE.

1,096,257.  Specification of Letters Patent.  Patented May 12, 1914.

Application filed March 21, 1913. Serial No. 755,923.

*To all whom it may concern:*

Be it known that I, JOHN R. McCLURE, a citizen of the United States, residing at Chicago, in the county of Cook and State of Illinois, have invented a certain new and useful Improvement in Die-Threading Machines, of which the following is a specification.

My invention relates to die threading machines and the object of the invention is to produce a simple and efficient machine for accurately cutting the threads or teeth upon the die.

As contributing to this general object, it is my purpose to provide a machine having a rotating cutter capable of simultaneously forming a plurality of screw cutting teeth upon the die and means for advancing the cutter in such manner as to "relieve" the teeth of the die, that is, to produce a "backing off" upon said teeth.

Another purpose of the invention is to provide means to produce relative movement axially between the cutter and the die to thereby obtain a pitch or lead in the die teeth.

In connection with the foregoing, it is my purpose to provide means for producing relative axial movement between the cutter and the die holder during the act of bringing a fresh face on the die up to the cutter to thereby produce the necessary pitch or lead.

It is also my purpose to render the machine largely automatic and to provide certain details of construction which will hereinafter be more particularly described.

I accomplish my objects by the mechanism illustrated in the accompanying drawings in which—

Figure 1 is a side elevation of the complete machine in its preferred form. Fig. 2 is a plan section on the line 2—2, Fig. 1. Fig. 3 is a sectional elevation on the line 3—3, Fig. 2. Fig. 4 is a fragmentary plan section taken on the line 4—4, Fig. 1. Fig. 5 is a section of the die upon the line 5—5, Fig. 2. Fig. 6 is a view of one of the dies looking at the cutting faces thereof. Fig. 7 is a side elevation of some of the principal operating parts of a modified form of my invention. Fig. 8 is an elevation looking from right to left in Fig. 7. Fig. 9 is an elevation of the machine looking toward the right, Fig. 1. Fig. 10 is a detail showing the means for reversing the direction of rotation of the worm.

Similar numerals refer to similar parts throughout the several views.

Referring to the preferred form of machine shown in Figs. 1 to 6 inclusive, the stationary main frame 1 supports a sliding table 2 mounted between parallel guides 1ᵃ. Rising from said table are two standards 3 having at the upper end a bearing 4 for the arbor 5. At the lower end the arbor has a screw threaded portion 5ᵃ which screws into the main frame and forms a lead screw for raising and lowering the cutter and producing the pitch upon the teeth on any given face of the die. By preference the arbor forms an integral part of the lead screw. According to the present design the arbor is offset at the point 5ᵇ to afford more space for the work holder; this, however, is a mere matter of design. Extending from the arbor 5 is an arm composed of the sleeve 7 which encircles the arbor, and the housing 8 in which the spindle 9 (see Fig. 4) is journaled. Said sleeve is rigidly secured to the lead screw so that when the arm is swung the lead screw rotates and causes the cutter 10, which is secured to the lower end of the spindle, to move bodily in a helical path and thus produce a pitch upon the die face which is being cut. During the ordinary operation of the machine, the arm 7, 8 swings back and forth through only a small arc, being manually returned to initial position after every cutting operation; that is, as soon as the cutter has traveled across a single face of the die. In the present machine when the cutter is making the cut, the arm 7, 8 swings in a clockwise direction when viewed as in Fig. 2. The preferred form of these parts is shown in detail in Fig. 4 wherein the sleeve 7 is shown to carry clamping bolts 12 which pass through a slot 13 formed in housing 8. Said slots are arranged horizontally and by loosening said bolts the housing may be adjusted horizontally to vary the length of the arm and thereby permit the machine to be adjusted for dies of different sizes.

Spindle 9 is driven by a belt 15 passing over a pulley fastened at the upper end of the spindle. In the present design the belt is carried over guide sheaves 16, although the precise manner of driving the spindle is immaterial and may be varied to suit conditions. The spindle 9 and cutter 10 may be raised and lowered in the housing 8 by means of a hand wheel 18 and operating mechanism, the type of which is well known in drill presses and similar machines, and therefore need not be described. The cutter 10, above mentioned, is adapted to cut a plurality of threads or teeth upon the die simultaneously. It is preferably a milling cutter formed on a taper so as to form the die teeth on a taper.

The dies 20 upon which the thread cutting teeth are to be formed (see Figs. 5 and 6) are mounted in a work holder 21 which screws upon a threaded stud 22 rising from the sliding table 2. By rotating the work holder upon the stud, the cutting faces 20$^a$ of the die will be brought to the cutter one after another and at the same time the die will be moved axially to produce the necessary lead or pitch on the die.

Various means may be provided for fastening the dies in the work holder during the operation of forming the thread-cutting teeth. In the present design the dies are held laterally between blocks 21$^a$ formed on the holder. The dies are held to the cutter by pins or studs 23 which pass through apertures in the dies and into the body of the work holder. In order to hold the dies down firmly to their seat in the work holder, it is desirable to form a horizontal slot in the pins above the dies and to insert wedges 24 which rest upon the dies.

As above mentioned, the work holder is rotatable upon the stud 22. I provide means for locking the work holder in any one of four positions, which means will now be described: Rising from the sliding table 2 at a point alongside of the work holder is a bracket 25 which is screwed to the table by a stud 26. This stud passes through a transverse slot 27 in the bracket to permit the latter to be adjusted transversely to enter any one of the four sockets 29 in the side of the work holder. The table 2 is constantly urged toward the right (Figs. 1, 2 and 3) by compression spring 31 which abuts the table at one end and at the other abuts a collar 32 formed in the near end of an adjusting screw 33 mounted in the bracket 34 secured to one of the guides 1$^a$. By adjusting the screw 33 the compression of the spring may be regulated. The tendency of the spring is to force the work (that is the die) away from the cutter. The action of the spring in forcing the work away from the cutter is limited by a stop 36 which engages the back of the bracket 25 and is carried by a bar 37 pivoted upon the pin 38 mounted in the slide 39 adjustably secured to the stationary guides 1$^a$. The slide is adjustably held in position by studs 40 which pass through horizontal slots 41 in the slide and screw into the side of the guide. Washers 42 are interposed between the head of the stud and the side of the slide. From the foregoing it is evident that the arm 37 is free to rotate about its pivot 38 and to permit the stop 36 to move toward and from the cutter. Means are provided for setting the bar in proper position, said means comprising two adjustable stops 43 and 44 which are located on opposite sides of said bar on the side of the machine opposite to the pivot 38. The stops are in the form of adjusting screws screwing into the blocks 45 and 46 respectively rising from one of the guides 1$^a$. A keeper 47 overlies the free end of the bar 37 and holds the latter down in position.

As previously mentioned, the sleeve 7 and housing 8 are rotatable about the arbor 5 as a center. The rotation of these parts about the arbor causes the cutter to advance through the faces on the die where the thread cutting teeth are to be formed. This advancing of the cutter is accomplished in my machine by a worm wheel 50 which is concentric with the arbor and is rigidly secured to it and to the sleeve 7. Said worm wheel is driven by a worm 51 which may be driven by a belt 52 operated by a band wheel 53 concentric with and connected to the guide sheaves 16. The rotation of the worm 51 and parts secured thereto produces not only an advancement of the cutter through the work but by rotating the lead screw 5$^a$ in the frame it causes said screw and connected parts, including the cutter 10, to rise and thereby produce the lead or pitch in the teeth being formed upon the die.

When the cut is completed the cutter is swung back again to starting position by manually operating the shifting handle 52$^a$ which causes the rod 52$^b$ to shift the crossed belt 52$^c$ from the loose pulley 52$^d$ over onto a suitable pulley 52$^e$ tight upon the shaft of worm 51. The rod simultaneously shifts the open belt 52 from the tight pulley 52$^f$ over onto the loose pulley 52$^d$.

In operation, as soon as the belt 15 is started it causes the cutter 10 to rotate. At the same time it also causes the band wheel 53 to rotate therewith and produces a rotation of the worm 51 and worm wheel 50. By this construction the worm wheel and cutter will always maintain a constant ratio of speeds. The movement of the worm wheel is very slow and causes sleeve 7 and housing 8 to swing about the axis of the arbor 5 as a center. This swinging of the housing produces a corresponding bodily movement of the cutter, the axis of the cutter moving parallel to itself. This causes the cutter to advance through the work. At the same time the lead screw and parts supported thereon including the cutter and housing advance axially and thereby produce a lead or pitch in the teeth being cut upon the die. The motion of the worm wheel 50 is confined within narrow limits, never moving over few degrees, for example 10 to 20.

The face of the die is preferably non-concentric with the work holder and the centers are so arranged that when the cutter face first engages the die it takes a shallow cut therein, but as the cutter advances it enters deeper and deeper into the die thereby producing teeth of various heights and consequently "backing off" or "relieving" the die. After the cutter has passed completely through the face of the die and completely formed the thread cutting teeth thereon, the operator disengages the worm from the worm wheel or otherwise manipulates the parts to permit him to swing the cutter back again to initial position (the return direction in the present design being anti-clockwise when viewed in plan as in Fig. 2). After the cutter has thus been reset, the operator retracts the thumb pin 28 and rotates the work holder 21 ninety degrees in an anti-clockwise direction, when he locks the work holder by slipping the pin into the next socket 29. The operation is then repeated and the teeth formed in a similar manner upon the next-presented face of the die. The rotation of the work holder in bringing the new face to the cutter causes the die to be moved axially thus causing the cutter to cut the teeth at a higher point on the new face than on the old one. This produces the proper pitch on the die.

When it is desired to produce dies capable of cutting threads on objects of larger diameter, the operator moves the cutter farther from the center of the arbor 5 by loosening the bolts 12, then sliding the housing 8 outward and afterward re-tightening the bolts. The work holder is moved bodily a proportionate amount and again secured. Thus the machine is adjustable for different size dies.

Referring now to the modified form shown in Figs. 7 and 8: This machine operates upon an analogous principle but instead of the cutter being movable about the axis of the arbor for advancing the cutter through the work, the axis of the cutter remains fixed and the work is swung past the cutter, also the swinging motion instead of being produced automatically is here shown to be produced by hand. In this modified form the cutter 10 is mounted so as to rotate upon a vertical axis, being supported in the housing 60 carried by the stationary arm 61 rising from the stationary machine frame 62. The work holder 63 is similar to the one previously described, having sockets 29 for holding it at different stations during the tooth cutting operation. The holder is also provided with pins 23 and wedges 24 as before. In this modified form of machine, I have omitted the details such as the means for adjusting the position of the work holder laterally and for holding it against rotation during the act of cutting the teeth. These parts may assume the same form as in the type of machine first described.

The work holder is threaded so as to screw up and down upon a threaded stud 65 to produce the pitch or lead between the teeth on one face of the die and those on the adjacent face. Stud 65 is mounted on a sliding table 66 confined in guides 67a upon the swinging table 67. The sliding table may be secured at any desired position upon the swinging table 67 by a set screw 68. A lead screw 69 is rigidly secured to the swinging table 67 and forms a pivot to connect it to the stationary bed of the machine. The lead screw is threaded at its lower portion and screws into the stationary bed frame. The lead screw and swinging table are fastened together by a stud 68 and consequently when said swinging table is swung laterally upon the stationary bed about the lead screw 69 as a pivot said lead screw causes the swinging table to rise or descend. The swinging table in the present form is manipulated by a handle 70.

In operation, when the table is swung a face of the die is caused to pass by the cutter and be cut, the lead screw 69 causing the die to move axially a few one-thousandths of an inch and the teeth on the die to obtain the proper pitch. After the teeth have been cut upon one face of the die, the table is swung back to initial position after which the work holder is rotated ninety degrees. This rotation of the work holder performs a double purpose of bringing a fresh die face to the cutter and producing relative axial movement between the die and the cutter for obtaining the proper pitch between the teeth on one face of the die and the teeth on the adjacent face. It will thus be seen that in each form of my machine the rotating milling cutter is adapted to form a plurality of teeth simultaneously, also that during the cutting operation there is a relative rotative movement between the cutter and the die, the relative rotative movement being centered at a point non-coincident with either the cutter axis or the axis of the work holder.

Having thus described my invention, what I claim as new and desire to secure by Letters Patent, is:

1. In a machine for forming teeth upon a die, the combination of a lead screw, an arm rigidly secured thereto and extending approximately radially therefrom, a rotary hob cutter mounted at the free end of said arm, means for rotating said cutter about its own central axis, and means for supporting the die in engagement with the cutter.

2. In a machine for forming teeth upon a die, the combination of a lead screw, an arm rigidly secured thereto and extending approximately radially therefrom, a cutter mounted at the free end of said arm, means for rotating said cutter about its own central axis, a rotatable work holder for holding said die, and a work holder screw for supporting said work holder, the axis of said screws being parallel for obtaining the proper pitch upon the teeth of the die.

3. In a machine for forming teeth upon a die, the combination of a rotating milling cutter having teeth for simultaneously cutting a plurality of teeth upon a die, means for rotating the cutter about its own central axis, a pivoted arm for swinging the cutter past the die to thereby cause the cutter to cut through a given face of the die and thus complete the teeth thereon, and means for simultaneously causing relative movement between the cutter and the die in an axial direction to thereby obtain the necessary pitch upon the die teeth.

4. In a machine of the class described, the combination of a swinging arm, a lead screw rigidly secured to one end of said arm for supporting it and advancing it in the direction of the axis of said screw, a milling cutter at the free end of said arm adapted to rotate about its own central axis and bodily about the axis of the lead screw, and a work holder for holding the die in position to be cut when the cutter is swung past the face of the die as a result of the swinging movement of the cutter and arm.

5. In a machine of the class described, the combination of a lead screw, an arm rigidly secured thereto, means for adjusting the length of said arm, a rotating cutter mounted in said arm with its axis parallel to the axis of the lead screw, and a work holder for holding the die in position to be cut when the cutter is swung past the face of the die as a result of the swinging movement of said arm.

6. In a machine of the class described, the combination of a rotatable lead screw, an arm rigidly secured to and extending from said screw, a cutter mounted in the free end of said arm, means for rotating said cutter about its own central axis, and means for adjusting the length of said arm.

7. In a machine of the class described, the combination of a rotatable lead screw, an arm rigidly secured to and extending from said screw whereby it may swing about the axis of the screw as a center and may also move in a direction parallel to the axis of the screw, a cutter mounted at the free end of said arm, means for rotating said cutter about its own central axis, and means for rotating said lead screw and arm.

8. In a machine of the class described, the combination of a rotatable lead screw, an arm rigidly secured to and extending from said screw, a cutter mounted in the free end of said arm and movable therewith both axially of the lead screw and about the axis of the lead screw as a center, means for rotating the cutter about its own central axis, an intermittently rotatable work holder, and a second lead screw whereon the work holder is mounted for advancing the work holder and work in a direction parallel to the axis of the first mentioned lead screw when the work holder is rotated.

9. In a machine for forming teeth upon a die, the combination of a rotatable lead screw, an arm rigidly secured thereto, a milling cutter adapted to simultaneously cut a plurality of teeth upon the die, said cutter being mounted at the free end of said arm and being rotatable about the central axis of said cutter but being otherwise movable in unison with said arm, a rotatable work holder, a lead screw for supporting said work holder, and means for locking said work holder in a plurality of different positions for holding the cutter stationary when any given face of the die is being cut.

10. In a machine for forming teeth upon a die, the combination of a rotatable but otherwise stationary lead screw, an arm rigidly secured thereto and extending therefrom, a rotating milling cutter mounted at the free end of said arm and adapted to simultaneously cut a plurality of teeth upon the die, means for rotating said die about its own central axis, a work holder for holding the die, said work holder being intermittently rotatable and being adjustable toward and from the center of the lead screw, and means for adjusting the length of said arm whereby dies of various sizes may be cut.

11. In a machine for forming teeth upon a die, the combination of a rotating milling cutter having teeth for simultaneously cutting a plurality of teeth upon the die, means for rotating the cutter, means for swinging the cutter past the die to thereby cause the cutter to cut through the face of the die and thus complete the teeth thereon, means for simultaneously causing relative movement between the cutter and the die in an axial direction to thereby obtain the necessary pitch upon the die teeth which are being cut, means for bringing the cutter and a fresh die face into engagement for cutting the teeth upon the latter, and additional means for causing further relative movement between the cutter and the die preparatory to the cutting of the fresh die face to produce the necessary pitch or lead between the teeth on one die face and the teeth on the next die face.

In witness whereof, I have hereunto subscribed my name in the presence of two witnesses.

JOHN R. McCLURE.

Witnesses:
 ETTA L. WHITE,
 MAX S. ROSENZWEIG.